(No Model.)
I. L. BENSON.
EXTENSIBLE NUT FOR VEHICLES.
No. 263,302. Patented Aug. 29, 1882.
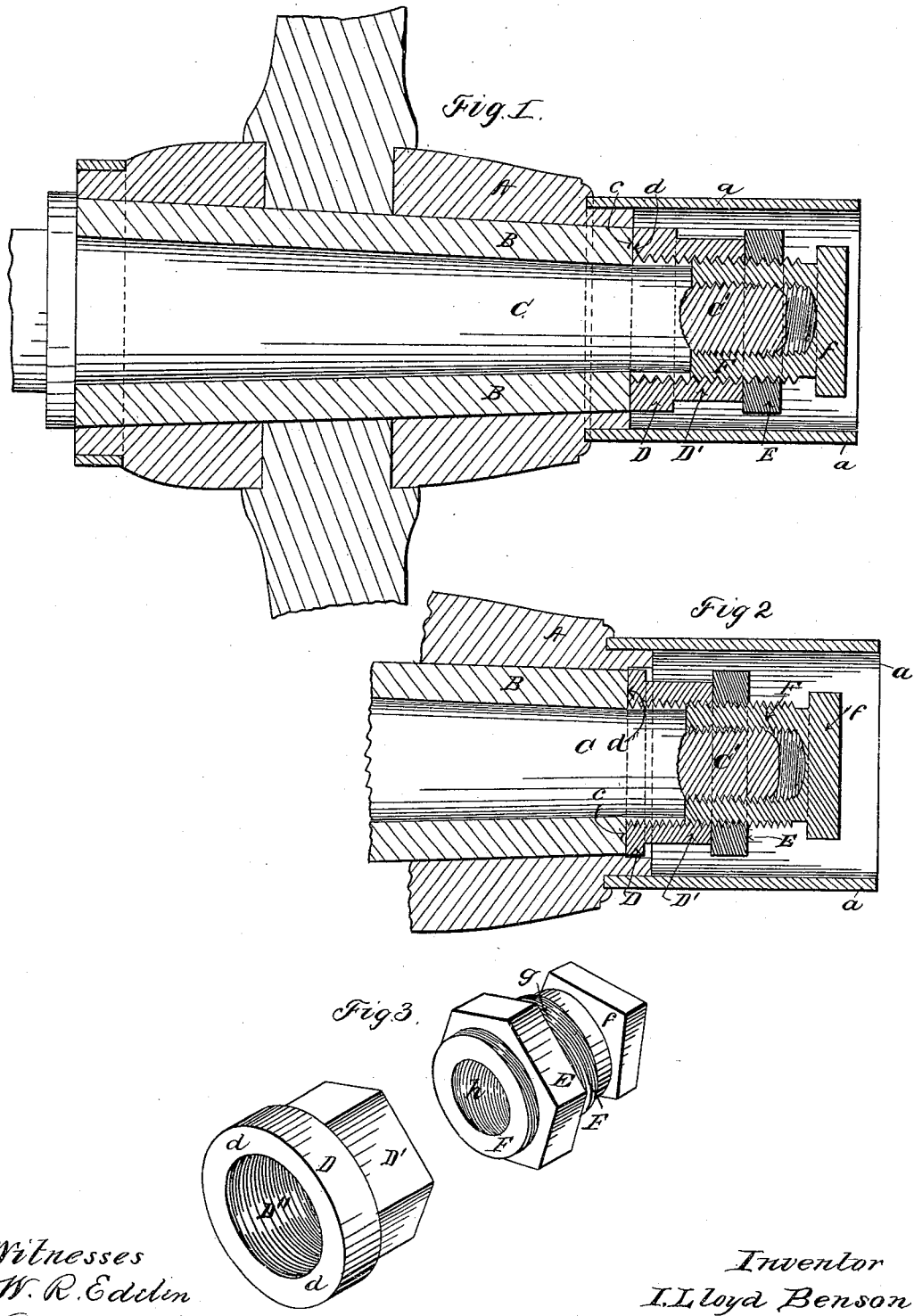
Witnesses
W. R. Edelin
Robt. H. Porter
Inventor
I. Lloyd Benson
Per Hullock & Hullock
Att's.

UNITED STATES PATENT OFFICE.

I. LLOYD BENSON, OF WATERFORD, PENNSYLVANIA.

EXTENSIBLE NUT FOR VEHICLES.

SPECIFICATION forming part of Letters Patent No. 263,302, dated August 29, 1882.

Application filed January 20, 1882. (No model.)

*To all whom it may concern:*

Be it known that I, I. LLOYD BENSON, a citizen of the United States, and a resident of Waterford, in the county of Erie and State of Pennsylvania, have invented new and useful Improvements in Extensible Nuts for Vehicle-Axles, &c.; and I do hereby declare that the following is a full, clear, and exact description thereof, reference being had to the accompanying drawings and the letters or figures of reference marked thereon.

My invention relates to the nuts on vehicle-axles, or the axles of other machinery, which hold the wheels in place.

The object of my invention is to so construct said nuts as to make them extensible, so as to take up wear of parts.

My device is illustrated in the accompanying drawings as follows:

Figure 1 shows a hub, axle, and attaching-nut in vertical longitudinal section, except the axle, which is in elevation, except the nipple thereon. Fig. 2 is a similar view with the nut extended somewhat. Fig. 3 is a perspective view, showing details of construction.

The letters of reference indicate the parts as follows:

A is the hub, with band $a$. B is the journal-box; C, the axle or journal; C', the nipple of the axle. F is the nut proper, with wrench-head $f$ and internal and external screw-threads, $h$ and $g$, respectively. D D' is the extensible part of the nut, of which D is the shoulder, having face $d$, which abuts against the face $c$ of the box B, and is provided with an internal screw-thread, D''. E is a jam-nut.

Ordinarily the nut is constructed with the shoulder D solid upon it, and when screwed to place upon the nipple C' the shoulder is at a fixed point, and when wear occurs on the faces $c$ and $d$, or at the other end of the hub, or both, it has to be taken up by the insertion of washers or by cutting down the shoulder of the nipple.

It will be readily seen that by my construction the nut can be elongated by turning the part D D' forward and locking it at the proper point by the jam-nut E. When the nut is turned off or on by a wrench on the head $f$ the other parts are not disturbed at all. In other words, the nut operates precisely the same as if it were solid, so far as its operation upon the nipple C' is concerned.

The use of such a nut need not be confined to vehicles, but it is capable of use upon many different machines.

To adjust this nut properly the operator should find the distance of the face $c$ on the box B from the shoulder of the nipple when the hub is shoved clear back upon the axle. He should then adjust the face $d$ of the part D the same distance (scant) from the inner end of the nut F and lock it there with the jam-nut E.

What I claim as new is—

An extensible nut consisting of the body F, with wrench-head and external and internal screw-threads, in combination with the movable part D D' and jam-nut E, substantially as and for the purposes set forth.

In testimony that I claim the foregoing I have hereunto set my hand this 7th day of December, 1881.

I. LLOYD BENSON.

Witnesses:
 JNO. K. HALLOCK,
 C. SWALLEY.